United States Patent
Essing et al.

(10) Patent No.: US 9,550,158 B2
(45) Date of Patent: Jan. 24, 2017

(54) METHODS OF OPERATING A METERING DEVICE FOR THE METERED DISPENSING OF PUMPABLE MEDIA, IN PARTICULAR COLOR PIGMENT PREPARATIONS, METERING DEVICE AND CANISTER

(71) Applicant: Collomix Rühr-und Michgeräte GmbH, Gaimersheim (DE)

(72) Inventors: Alexander Essing, Ingolstadt (DE); Michael Schmidt, Eitensheim (DE)

( * ) Notice: Subject to any disclaimer, the term of this patent is extended or adjusted under 35 U.S.C. 154(b) by 2 days.

(21) Appl. No.: 14/345,324

(22) Filed: Mar. 17, 2014

(65) Prior Publication Data
US 2016/0199866 A1   Jul. 14, 2016

(51) Int. Cl.
| | | |
|---|---|---|
| *B01F 15/00* | (2006.01) | |
| *B05B 12/14* | (2006.01) | |
| *B01F 13/10* | (2006.01) | |
| *B01F 15/02* | (2006.01) | |

(52) U.S. Cl.
CPC ..... *B01F 15/00155* (2013.01); *B01F 13/1058* (2013.01); *B05B 12/149* (2013.01); *B01F 15/0247* (2013.01)

(58) Field of Classification Search
CPC ............ B01F 15/00155; B01F 13/1055; B01F 13/1058; B01F 13/1061; B01F 13/1063; B01F 13/1066; B01F 13/1069; B05B 12/149; B05B 12/1409–12/1481
USPC ......................................................... 73/1.31
See application file for complete search history.

(56) References Cited

U.S. PATENT DOCUMENTS

| | | | | |
|---|---|---|---|---|
| 5,163,010 A | * | 11/1992 | Klein ................... | A45D 44/00 222/135 |
| 5,887,975 A | * | 3/1999 | Mordaunt ............. | B01F 3/088 366/152.1 |
| 9,359,184 B2 | * | 6/2016 | Post ..................... | B67D 7/3245 |
| 2003/0110101 A1 | * | 6/2003 | Friel ..................... | B01F 13/1055 705/28 |

(Continued)

*Primary Examiner* — Peter Macchiarolo
*Assistant Examiner* — Nathaniel Kolb
(74) *Attorney, Agent, or Firm* — Southeast IP Group, LLC.; Thomas L. Moses

(57) ABSTRACT

The invention relates to a method of operating a metering device (1) for metered dispensing of pumpable media, in particular of color pigment preparations, the metering device (1) comprising a dispensing means (2), which is in fluid connection with a plurality of canisters (3), wherein said metering device (1) comprises a controller (8) by means of which at defined times a defined dispensing volume of the medium is drawn from at least one of said canisters (3) and conveyed to said dispensing means (2) by means of a conveyor (10), wherein, in particular, by means of said controller (8) also an actual fill level is determined and/or calculated depending on a dispensing volume drawn from the respective canister (3). According to the invention, at least one calibration sensor (30), in particular a capacitive sensor, is arranged on said canister (3), preferably on an outer wall of said canister (3), in such a way that it is responsive in the event that the medium in said canister reaches at least a defined known calibration fill level, and transmits a corresponding sensor signal to said controller (8), based on which the controller (8) recognizes the calibration fill level as effective actual fill level and/or takes it over as a new current actual fill level. Further, a metering device and a canister are provided (FIG. 3).

14 Claims, 3 Drawing Sheets

(56) References Cited

U.S. PATENT DOCUMENTS

Figure 1:
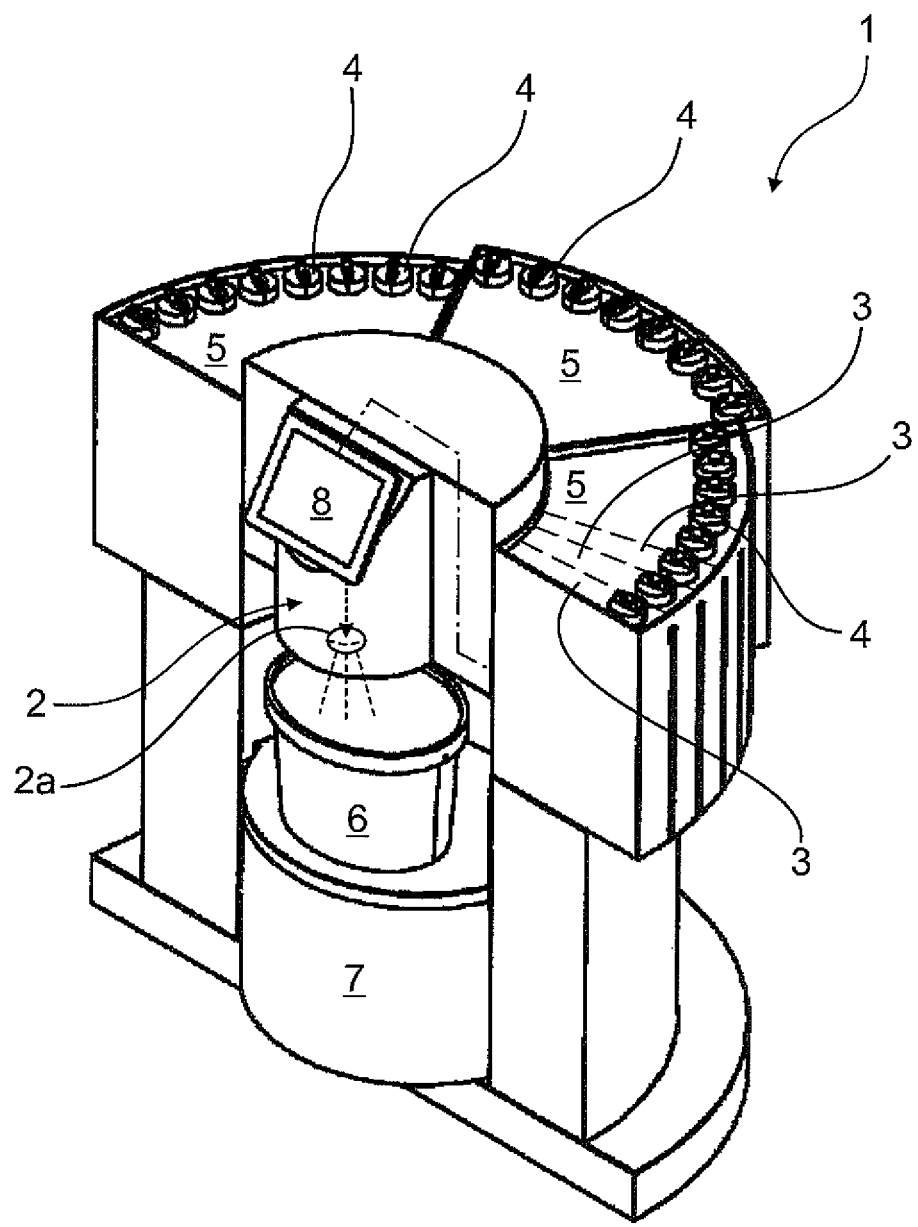

| | | | |
|---|---|---|---|
| 2006/0009875 A1* | 1/2006 | Simpson | B01F 3/0803 700/240 |
| 2006/0080041 A1* | 4/2006 | Anderson | B01F 13/1055 702/19 |
| 2008/0144427 A1* | 6/2008 | Phallen | B01F 3/0865 366/132 |
| 2014/0326748 A1* | 11/2014 | Post | B67D 7/3245 222/55 |

* cited by examiner

METHODS OF OPERATING A METERING DEVICE FOR THE METERED DISPENSING OF PUMPABLE MEDIA, IN PARTICULAR COLOR PIGMENT PREPARATIONS, METERING DEVICE AND CANISTER

The invention relates to a method of operating a metering device for metered dispensing of pumpable media, in particular of color pigment preparations according to the preamble of claim 1, a metering device according to the preamble of claim 9 and a canister according to the preamble of claim 12.

Metering devices for metered dispensing of pumpable media, especially color dispenser for dispensing color pigment preparations are well known from practice. Such color dispensers regularly comprise a housing harboring various canisters containing the color-containing pigment preparations. These canisters are in fluid connection with a pumping device, which in turn is in fluid connection with a dosing head unit. By means of such color dispenser, thus, predetermined shades can be mixed reproducibly, wherein the individual components are controlled specifically by means of a computer unit, in which different color combinations are stored. The medium is regularly dispensed by a metering head of the metering head unit, which usually comprises several dispensing nozzles for metering into a container containing a base color, such as a white or transparent color.

Such color dispenser is known for example from DE 695 15 042 T2, wherein several pumps and motor driving the pumps are arranged on a common base plate and coupled. The pumps have an inlet port and an outlet port that are, via hoses, in fluid connection, on the one hand, with an associated canister, and, on the other hand, with a dispensing valve that is arranged spaced apart above the pump and the canisters. Furthermore, another hose leads from the dispensing valve to the canister. With such a structure, fluid can be passed to a dispensing head via the dispensing valve by means of the pump and the respective associated hoses. Further, the dispensing valve can also be connected or controlled so that the fluid is recirculated through the tubing and the dispensing valve. For canister maintenance, the center portion of the housing area has an access door. Another repository serves as another access door for servicing the shorter canisters arranged underneath.

A similar construction, in principle, is known from U.S. Pat. No. 5,328,057, in which the canisters comprise lids through which material can be filled in or refilled.

In operation of such metering device periodically, at predetermined times, certain volumes of the medium contained in each of the canisters are drawn and dispensed via the metering unit and the metering head, respectively, thereby reducing the fill level in the respective canisters. If this is done purely mathematically, there is a risk that errors add up, for example, in connection with refill and discharge processes and thus can significantly distort the fill level. This can then lead to the projected fill level does not reflect the effective actual fill level and therefore, without recognizing the need for refilling, the canister is already emptied to such an extent that a desired volume of media no longer can be dispensed.

Furthermore, it is well known to detect fill levels of containers containing pumpable media by means of fill level measuring devices, such as a sensor assembly in the canister. By the large number of canisters used, in particular, in a color dispenser, however, very high costs arise when implementing such high quality and functionally reliable fill level measurement for each of the canisters. Therefore, the fill levels are often measured manually by the insertion of a rod, which of course does not provide precise and thus satisfactory results.

It is therefore an object of the present invention to provide a method for operating a metering device for the metered dispensing of pumpable media, in particular for metered dispensing of color pigment preparations, by means of which a fill level control of the fill level in the respective containers can be performed in a simple, functionally reliable and inexpensive manner. Furthermore, it is an object of the present invention to provide a metering device, by means of which such a method can be performed in a simple, functionally reliable and inexpensive manner can be performed. It is a further object of the invention to provide a suitable canister for use in a method according to the invention or for use in a metering device according to the invention.

This object is achieved with the features of the independent claims. Advantageous embodiments are the subject matter of the claims relating back thereto.

According to claim 1, a method of operating a metering device for metered dispensing of pumpable media, in particular of color pigment preparations, is provided, the metering device comprising a dispensing means, in particular a metering unit with a metering head, which is in fluid connection with a plurality of canisters, wherein said canisters are or will be each filled with a defined quantity of a medium to be dispensed, and wherein said metering device comprises a controller by means of which at defined times a defined dispensing volume of the medium is drawn from at least one of said canisters and conveyed to said dispensing means by means of a conveyor. Optionally, preferably, it is provided that a current actual fill level is determined and/or calculated by means of said controller depending on a dispensing volume drawn from the respective canister. According to the invention at least one calibration sensor, in particular a capacitive sensor, is arranged on said canister, preferably on an outer wall of said canister, in such a way that it is responsive in the event that the medium in said canister reaches at least a defined, previously known or preferably in the controller stored calibration fill level, and transmits a corresponding sensor signal to said controller, based on which the controller recognizes the calibration fill level as effective actual fill level and/or takes it over as a new, current actual fill level.

Thus, with such an arrangement of a calibration sensor a system is created, by means of which it is ensured in a simple and also functionally reliable manner that the fill level in the tank cannot fall below a critical minimum value. In addition, in this way a self-calibrating system is created by means of which at least at certain times it can be checked, whether the actual fill level mathematically determined by the controller actually corresponds to the effective actual fill level in the respective canister, as will be explained in more detail below:

Thus, especially preferred is a process control in which by means of the controller for fill level control and/or fill level determination a respective current actual fill level is determined in such a way that in each case the current actual fill level of a canister stored by the controller is reduced by the value corresponding to the dispensing volume drawn from the canister. The value reduced by this dispensing volume represents the new, current actual fill level in the respective canister, and is stored accordingly. Said controller compares a currently stored actual fill level with at least one predetermined fill level threshold, wherein in the case that in a canister a new, current actual fill level reaches a predetermined fill level threshold or falls below the same, a refill indication is output and/or displayed. Then, the respective canister is filled with a defined refill volume, wherein the refill volume is detected by the controller and/or transmitted to the same and/or entered into the same. Then, after the filling process, the controller takes over as the start value for the current actual fill level value preferably a value, which is composed of the sum of a refill fill level value corresponding to the refill volume and the last stored actual fill level.

Thus, by means of such preferred process control, a respective current actual fill level can be calculated or determined in a simple manner by the controller, in which case, however, there is still a risk that certain inaccuracies or errors, in particular with regard to refilling, add up, and may be reflected in an incorrect value for the fill level threshold. The at least one calibration sensor provided according to the invention also, or mainly, helps to avoid this, which is responsive in case that the fill level of the medium corresponds to at least one calibration fill level, and transmits a signal to the controller, based on which the controller recognizes the calibration fill level as effective actual fill level and/or takes it over as new current actual fill level. Thereby, as already mentioned above, a self-calibrating system can be provided in a simple and moreover also functionally reliable manner by means of which it is checked, at least at certain times, whether the current actual fill level that is mathematically determined by the controller actually corresponds to the effective actual fill level in the respective canister and also the decrease of the fill level below a minimum value can be reliably avoided.

Particularly advantageous is further a process control in which prior to the initial removal of medium from a canister an initial fill level of the respective canister corresponding to the initial fill volume is provided to and/or entered into said controller as start value for the current actual fill level.

Generally, said at least one calibration sensor can be arranged on said canister in such a way and/or at such a canister height that the calibration fill level corresponds to said or a predetermined fill level threshold, where upon reaching the same a refill indication is displayed, because then, simultaneously with the detection of a need for refilling, the calibration of the controller functioning as fill level measuring device may be performed.

According to a further particularly preferred embodiment it is provided that that for preferably each of said canisters, a first fill level threshold is set by said controller, where upon reaching the same said controller outputs a refill indication for the respective canister(s). Furthermore, preferably, for each of said canisters, a second fill level threshold is set by said controller which corresponds to a lower fill level than said fill level associated with said first fill level threshold, preferably corresponding to a minimum fill level. Upon reaching the same, said controller outputs a further alarm and/or refill indication for the respective canister(s). In this case, for example, said metering device is deactivated preferably until a refill process for said canister(s) has taken place, and/or such process is detected and/or entered. With such a stepped alarm, after receiving the first alarm indication, for example, there is enough time to perform the refill process. This can be indicated, for example, by an alarm light on a display. If this refill indication is not followed up and the second threshold is reached, there is a risk that not enough medium will be in the canister, and accordingly, no proper dispensing of the medium can be made. In this case, a more stringent alarm will be outputted, for example, an acoustic signal, and/or the metering device will be deactivated and the refill process will be forced more or less. This significantly increases the dispensing reliability when metering media.

Using the above process control or fill level determination and/or fill level control according to the invention, acknowledged also in conjunction with the optional embodiments, a fill level control can be performed both in a functionally reliable as well as a simple and inexpensive way in particular in such metering devices in which several canisters are provided, because here, the fill level determination still is performed in a simple manner essentially by calculation, but at given times, an advantageous self-calibration of the system can be performed by means of a structurally simple and thus inexpensive calibration sensor.

Preferably, the calibration sensor is a capacitive sensor, which, in the case of a lowering of the fill level in the canister in such a manner, that the pumpable medium present in the canister has a certain, defined distance from it, and thus leaves the vicinity of its active zone, changes its electric field which can be detected by means of electrical signals and evaluated accordingly by the controller. Such a sensor consists in its basic structure, for example, of an RC oscillator as pick-up, a demodulator and an output stage, wherein the active surface of the capacitive sensor is formed by two generally metallic electrodes. As long as the pumpable medium is present in the active zone of the electric field of the electrode surface, the capacity is constant. Whenever the fill level falls until no longer pumpable medium is present in the area of the active zone of the sensor, the electric field changes and the coupling capacitance is changed, whereby the oscillator starts to oscillate. According to a particularly preferred embodiment, a calibration sensor is provided, whose sensor surfaces are arranged on opposite sides of the canister and/or on the outer wall of the canister.

The advantage of such capacitive sensors is that they can be operated by both conductive and non-conductive materials, and thus can also detect fill level changes of color pigment preparations, for example, in a simple way.

Such calibration sensors can also be mounted in a simple manner on the outside or an outer wall of the canister and there is no need for a complex arrangement inside the canister, as is the case for other sensor arrangements. In addition, such calibration sensors can be integrally connected with the outer wall of said canister, for example, glued on there. Particularly preferred in this context, for example, is a construction of a calibration sensor as a film sensor, because it conforms very well to the outer wall geometries of canisters and its entire structure is small in size.

Overall, therefore, using such process control according to the invention, fill level measurement can be performed that is structurally simple and thus inexpensive to produce, and above all, dependable and functionally reliable.

A metering device according to the invention comprises a dispensing means, in particular a dispensing head, which is in fluid connection with several canisters, each canister being filled or fillable with a predetermined initial fill volume of a medium to be dispensed. The metering device comprises a controller, by means of which at defined times a defined dispensing volume of the medium can be controllably drawn from one of the canisters and conveyed by a conveyor to the dispensing means. Optionally, the controller comprises a fill level determination unit, by means of which a current actual fill level can be determined for said canisters depending on a dispensing volume drawn from each canister. According to the invention, it is provided that at least one calibration sensor, in particular, at least one capacitive sensor is arranged on the canister, preferably on an outer wall of the canister, in such a way that it is responsive when reaching at least one calibration fill level of the medium in the canister that is associated therewith, defined or known and/or stored in the controller, wherein the at least one calibration sensor is coupled to the controller in a signal transmitting manner.

Further, optionally, it can be provided, that the controller comprises a calibration unit by means of which the calibration fill level can be set as new, current actual fill level, either based on a defined deviation of the calibration fill level as the effective actual fill level from the current actual fill level determined by said controller detected by said calibration unit by means of a comparator unit, or without any further check.

In addition, the controller preferably comprises a fill level determination unit, by means of which a respective actual fill level can be determined for the canisters as a function of a dispensing volume drawn from the canisters. Next, the controller comprises a fill level memory unit in which the fill level value reduced as a function of a drawn dispensing volume is stored as the new, current actual fill level.

Preferably, said controller further comprises a comparator unit by means of which a currently stored actual fill level can be compared with at least one predetermined fill level threshold. Furthermore, the controller preferably comprises an indicator and/or signaling means, for instance a visual and/or audible indication, by means of which a detected necessary refill process can be indicated. Said controller further comprises a fill level start value setting unit, by means of which a filling process can be detected and/or by means of which a start value can be set for the current actual fill level following a filling process.

Using such a metering device according to the invention, in particular, the process control according to the invention can be carried out in a particularly simple and functionally reliable manner. The advantages resulting therefrom have already been explained in detail in conjunction with the description of the advantages of the process control. In this respect, reference is made to the statements provided above.

An advantageous canister for use in a process control according to the invention or in a metering device according to the invention is provided with the features of claim 12. Accordingly, at least one calibration sensor, in particular a capacitive sensor, is arranged on the canister, preferably on an outer wall of the canister, for example, at a canister height defined by the direction of a vertical axis, wherein preferably it is provided that the at least one calibration sensor is configured as a film sensor and/or integrally combined with the outer wall of the canister, and in particular is glued there.

In addition, on such a canister, a calibration sensor can be arranged, for example, the sensor surfaces of which being arranged on opposite sides of said canister and/or on the outer wall of the canister.

The term canister is understood here in a broad sense. As described above and will be described below, a canister is a metering means for use in a metering device, such as a color dispenser, wherein the metering means contains the respective pumpable medium, in particular, a color pigment preparation, and at predetermined times a defined volume of the pumpable medium is drawn from the metering means, drawn in particular by means of the metering device. Thus, the term canister is here explicitly synonymous with the term metering means.

At this point it should be mentioned explicitly that the term controller is both above and below is always to be understood in a broad sense and constitutes a unit comprising several subunits or interacts with several subunits. These subunits may be formed by any components of the metering device.

In the following, the invention will be explained with reference to a drawing.

Figure 2:
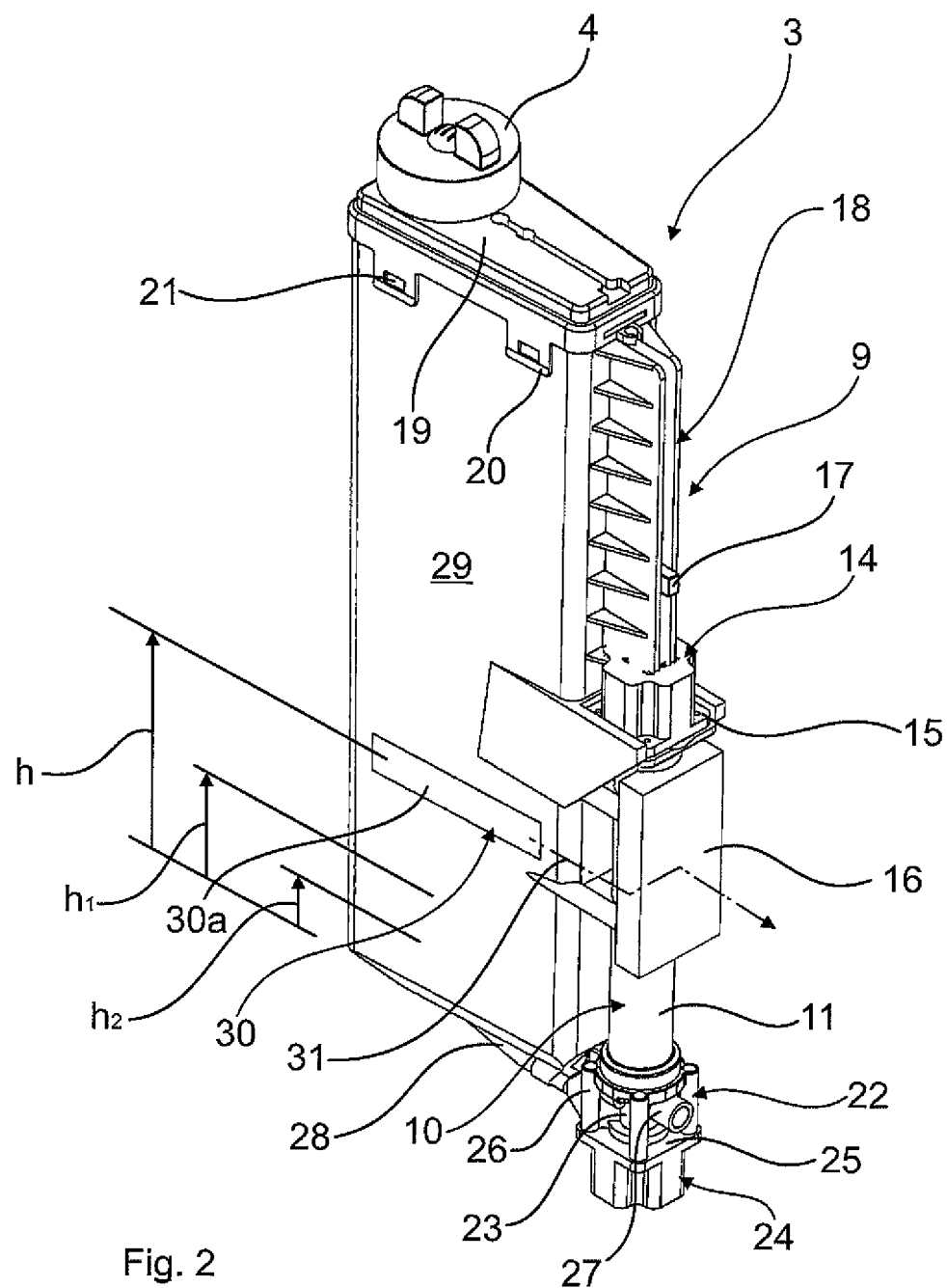
Figure 3:
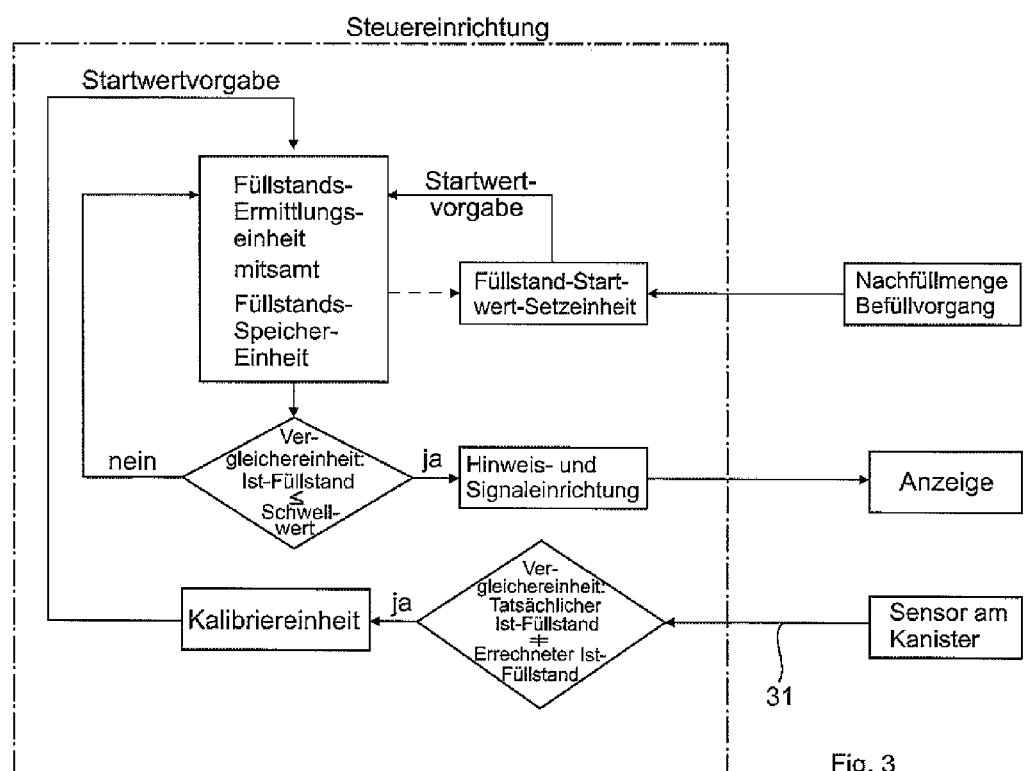

FIG. 1 shows schematically and in perspective view, a metering device forming color dispenser for metered dispensing of pumpable media, in particular for metered dispensing of color pigment preparations, with a plurality of canisters harbored by the metering device, FIG. 2 shows schematically an enlarged detailed representation of a canister with a capacitive sensor arranged on the outer wall of the canister; and FIG. 3 shows schematically and in principle as block diagram an exemplary embodiment of a fill level determination unit of a controller of the color dispenser.

FIG. 1 shows schematically and in perspective view a metering device functioning as color dispenser 1 for dispensing, in this case, for example, colors or color pigment preparations. About a central metering head unit 2 a plurality of canisters 3 are arranged in a semicircle, with their long sides substantially adjacent to each other or with a defined gap distance spaced apart, where from each of said canisters 3 only one lid 4 covering a refill opening can be seen, and the canister tops otherwise covered by a cover plate 5 forming a part of a housing wall color Dispenser 1. Cover plate 5 is removable, so that canisters 3 and the service openings, respectively, are accessible, which will be described in more detail below. Here, canisters 3 preferably have a piepiece-shaped or wedge-shaped outer contour, where, as schematically illustrated in FIG. 1, optionally also canisters 3 of different lengths or size can be used.

Canisters 3 are filled with different color pigment preparations and can, as will be explained in greater detail below, by appropriate control convey their respective color pigment preparation to metering head 2*a* of metering head unit 2, where the respective color pigment preparation is introduced into mixing vessel 6 containing a basic color, such as, for example, white or transparent, and which is located here, for example, on a pedestal like receptacle 7 of color dispenser 1.

Metering head unit 2, together with an associated housing unit harboring canisters 3, as shown, is arranged spaced above a footprint of color dispenser 1 and spaced above receptacle 7 for mixing vessel 6.

Controller 8, here in exemplary fashion represented by a control computer, is arranged at metering head unit 2, and in which the different color compositions are stored, and therefore different color mixtures can be provided by means of the color dispenser 1.

Canisters 3, shown in FIG. 1, preferably and by way of example formed as a piepiece-like or wedge-shaped container can be constructed, in principle, as shown in FIG. 2, however, the canisters 3 can basically have any other shape, for example, can be formed as round or rectangular containers.

On a narrow side 9 of the canister associated with metering head unit 2 there is arranged a piston pump 10 extending over at least a portion of the narrow side length comprising a pump cylinder 11 which is connected to canister 3 or the narrow side 9 thereof, or is arranged thereon, optionally also connected to the same material and/or in one piece therewith. In said pump cylinder 11, a piston of the cylinder-piston pump 10 is guided displaceably, for which purpose the piston is connected to a piston rod, not shown here.

Seen in the vertical axis direction of canister 3, at the upper end of pump cylinder 11, the piston rod interacts with a spindle nut (not shown here) of a piston actuator means 14, the piston actuator means 14 or its housing comprising a connecting flange 15, which is securely connected with an associated connection flange portion of the upper end of pump cylinder 11 by means of several screws (not shown here).

Piston actuator means 14 may be formed for example by a stepping motor which drives the spindle nut (not shown here) in the one or the other direction, whereby the piston rod and thus the piston may be shifted accordingly up or down within pump cylinder 11. The selection of this step motor is, for example, by control electronics 16 arranged on the outside of the pump cylinder 11, and here illustrated only very schematically and by way of example, which forms part of controller 8 and cooperates with the latter, respectively.

A sliding block 17 is arranged on a free end portion of the piston rod projecting over piston actuator means 14, and is guided and received displaceably in a guide groove 18 formed on narrow side 9 of canister 3.

A multi-way valve 22 is arranged on an end portion of pump cylinder 11 opposite to piston actuator means 14 in such a way that pump cylinder 11 connects with a lower free end region in the vertical axis direction directly to a valve housing 23 of multi-way valve 22.

Seen in the vertical axis direction downwards, a valve actuator means 24 follows after valve housing 23. This valve actuator means comprising, for example, an actuator comprises a mounting flange 25 which is associated with several screw bosses 26 that are arranged circumferentially about valve housing 23 and spaced apart, in such a manner that valve actuator means 24 can be screwed by means of a plurality of fixing screws (not shown here) through mounting flange 25 into screw bosses 26 and thus to valve housing 23 to connect valve actuator means 24 or its housing securely to valve housing 23.

Preferably, the selection of valve actuator means 24 is carried out again via control electronics 16 which, in turn is controlled by controller 8 by means of a program, as already explained above.

Multi-way valve 22 is in fluid connection to metering head unit 2 via a tube connection 27, not shown here in detail. Also, multi-way valve 22 is in fluid connection with the canister interior via at least one flow channel 28, so that, accordingly controlled by control electronics 16, when operating the pump, color pigment preparation from the interior of the canister can be sucked into pump cylinder 11 via flow channel 28 and multi-way valve 22. Then, by corresponding reverse piston movement, the color pigment preparation sucked into pump cylinder 11 can be pushed or pumped out of the latter and through hose connection 27 to metering head unit 2.

On the outer wall 29 of canister 3, which, for example, is formed here by a longitudinal side of canister 3, a calibration sensor 30 formed, for example, by a capacitive sensor, is arranged at a defined canister height h, seen in the vertical axis direction, comprising here, for example, two sensor surfaces 30a which are arranged on opposite outer walls 29 of canister 3 at canister height h, in such a way that in FIG. 2 only one of the two sensor surfaces 30a is shown. The calibration sensor 30 or its sensor surfaces 30a is formed here merely as an example, as a film sensor. Sensor surfaces 30a, for example, have here a rectangular shape and extend substantially over the entire width of the outer wall of the canister. Height h could correspond, for example, to a fill level, for example, the minimum fill level, of the color pigment preparation in respective canister 3, and when it is reached the need for a refill is displayed by controller 8. In the exemplary embodiment shown in FIG. 2, the canister or calibration sensor height h is above a mathematically determinable alarm fill level height h1, at which an alarm signal is outputted, indicating the need for a refill, which will be explained in more detail below. This alarm fill level height h1 is in turn above another mathematically determinable minimum fill level $h_2$, at which point a further alarm signal (more intense compared to the first alarm stage) is outputted, for example the operation of color dispenser 1 is stopped, which will also be explained in more detail below.

Calibration sensor 30 or its sensor surfaces 30a is or are, which in FIG. 2 is only shown very schematically by the dash-dotted arrow 31, signal-connected to the controller 8 optionally with interposition of control electronics 16.

As shown in FIG. 3 only very schematically and by way of example, controller 8 comprises a fill level determination unit, by means of which a respective actual fill level of canisters 3 is determined as a function of dispensing volume drawn from canister 3 in such a way that in each case the actual fill level of a canister stored currently by the controller in a fill level memory unit is reduced by the value corresponding to the dispensing volume drawn from the canister, wherein the value reduced by this dispensing volume represents the new, current actual fill level, and this value is stored accordingly in the fill level memory unit. Before the first removal of medium from a canister 3, controller S or the fill level determination unit uses here a starting fill level of the respective canister 3 corresponding to the starting fill volume as the start value for the current actual fill level which is, for example, detected by the controller 8 or entered in the same.

By means of a comparator unit of controller 8 a currently stored actual fill level can be compared with a fill level threshold calculated by controller 8 corresponding to height h1 or height h2, and in the event that the new current actual fill level reaches or falls below the predetermined fill level threshold $h_1$, an indicator or alarm means of the controller outputs, for example, a visual and/or audible indication that respective canister 3 must be filled. In the event that the new current actual fill level were to reach or fall below the predetermined fill level threshold $h_2$, however, the indicator and alarm means of controller 8 will output a more intense alarm signal, for example a warning sound and/or the operation of color dispenser 1 is stopped and thus refilling is forced.

In case of a need for refilling of one of canisters 3 detected by controller 8, canister 3 is filled with a defined refill volume, the refill volume being detected by controller 8 and/or transmitted to the same and/or entered in the same. Based on this refill volume detected by controller 8 or transmitted to the same or entered into the same, a defined start value for the current actual fill level is determined by means of a fill level start value setting unit of the controller, which is composed of the sum of the refill fill level value corresponding to the refill volume and the last stored actual fill level. To this end, the currently stored actual fill level value is transmitted to the fill level start value setting unit, as shown symbolically in FIG. 3 by the dashed arrow drawn. In principle, all of this can be automatically determined, detected and set by the controller.

Since errors may add up in such determination and setting of the start value optionally associated with the refill process or the accuracy of detecting the volume of pigment preparation drawn, it is necessary to calibrate the start value presetting at certain times, that is to say matching it with the effective actual fill level in the canister.

For this purpose, controller 8 has a calibration unit by means of which calibration is performed. This calibration is performed each time when the fill level of the color pigment preparation in canister 3 reaches height h, because then the calibration sensor, preferably formed by a capacitive sensor 30, is responsive, and due to a change of its electric field, transmits a signal (arrow 31) to the calibration unit of controller 8. Controller 8 or its calibration unit will then know that the effective actual fill level in canister 3 corresponds exactly to the predetermined or previously known calibration fill level h stored in controller 8 or in the calibration unit, and then, for example, by comparison with the calculated current actual fill level, could determine whether or to what extent the calculated actual fill level deviates from the effective fill level corresponding to the calibration level, and could then, in case of a defined deviation, base any further calculations of controller 8 on the calibration fill level as the current actual value instead of the calculated actual fill level currently stored in the fill level memory unit. Alternatively, even without such comparison, the calibration unit can transmit the calibration fill level immediately to the fill level memory unit as the new current actual fill level, which is to be used as the basis for any further calculations. This start value setting by the calibration unit has, of course, in any case, priority over the setting by calculation, or is superimposed on the latter, so that in case of start value setting by the calibration unit, solely the calibration fill level is taken over as the new actual fill level by the fill level determination unit.

Thus, a self-calibrating system is established in a simple manner, in which errors cannot add up in the manner previously illustrated.

To allow refilling, canister 3 has, as can be seen in particular from FIG. 2, a refill opening at lid 19 which is closing a service port, the refill opening having a smaller opening diameter in relation to the service port, and also can be closed by means of a separate refill opening lid 4, as has already been explained above in detail in connection with FIG. 1.

To close the service port, which essentially extends over the entire top of the container, lid 19 is provided with peripheral tabs 20. Said tabs 20 of lid 19 fit over the edge portion of the service port and are detachably locked to wall-side locking lugs 21 and to opposite exterior walls 29 of canister 3.

What is claimed:

1. A method of operating a metering device for metered dispensing of pumpable color pigment preparations, the steps comprising:
   providing a metering device comprising a dispensing means connected to a plurality of canisters; a controller; and a conveyor;
   providing at least one calibration sensor arranged on said canisters coupled to said controller in a signal transmitting manner;
   storing a defined and predetermined calibration fill level in said controller;
   filling said canisters with a defined starting quantity of a medium to be dispensed;
   drawing up a defined dispensing volume of the medium from at least one of said canisters by means of said controller;
   conveying medium to said dispensing means by means of said conveyor;
   determining the current actual fill level by means of said controller depending on the dispensing volume drawn from the respective canister;
   transmitting a sensor signal from said calibration sensor to said controller in the event that the medium in said canister reaches at least a defined and predetermined calibration fill level previously stored in said controller;
   determining when the current, actual fill level of said canister reaches said defined and predetermined calibration fill level previously stored by said controller
   reducing the respective actual fill level of said canisters by the value corresponding to the dispensing volume drawn from said canister;
   storing the new, current actual fill level of said canisters after the volume has been reduced by said dispensing amount;
   comparing a new, currently stored actual fill level of said canisters with at least one predetermined fill level threshold;
   displaying a refill indication when a new, currently stored actual fill level of said canister reaches or falls below said predetermined fill level threshold;
   refilling said canister with a defined refill volume;
   detecting and transmitting said refill volume to said controller;
   storing current actual fill level start value as the sum of the refill volume and the last stored actual fill level;
   transmitting a signal from said calibration sensor to said controller in the case where the fill level of the medium corresponds to the at least one calibration fill level; and
   recognizing by means of said controller that the calibration fill level is effective new, current actual fill level.

2. The method according to claim 1, further comprising the step of: signaling said controller, by means of said calibration sensor, to take over the calibration fill level as new, current actual fill level, either if said controller detects a defined deviation of the effective actual fill level corresponding to the calibration fill level from the current actual fill level calculated by said controller, or without any further checks.

3. The method according claim 1, further comprising the step of: providing and entering into said controller an initial fill level of the respective canister corresponding to the initial fill volume as start value for the current actual fill level, prior to the initial removal of medium from said canister.

4. The method according claim 1, further comprising the step of: arranging at least one said calibration sensor on said canister in such a way and at such a canister height that the calibration fill level is at least equal to a predetermined fill level threshold, where upon reaching the same a refill indication is displayed by said controller.

5. The method according to claim 1, further comprising the steps of:
   setting a first fill level threshold ($h_1$) for each of said canisters by said controller, where upon reaching the same, said controller outputs a refill indication for the respective canister(s);
   setting a second fill level threshold ($h2$) for each of said canisters by said controller which corresponds to a lower fill level than said fill level associated with said first fill level threshold ($h1$), where upon reaching the same, said controller outputs a further refill indication for the respective canister(s); and
   deactivating said metering device until a refill process for said canister(s) has taken place, and such refill process is detected.

6. The method according to claim 1, wherein said at least one calibration sensor has opposing sensor surfaces, the method further comprising the step of: arranging the surfaces on opposite sides of an outer wall of said canisters.

7. The method according to claim 1, further comprising the step of:
gluing at least one said calibration sensor on the outer wall of said canister such that said calibration sensor is integrally connected with said outer wall.

8. A metering device comprising:
a dispensing means connected to a plurality of canisters wherein said canisters can be each filled with a defined starting fill volume of a medium to be dispensed;
a controller whereby a defined dispensing volume of the medium can be drawn controllably at defined times from at least one of said canisters;
a conveyor to convey said volume of medium to said dispensing means;
at least one calibration sensor arranged on at least one of said plurality of canisters whereby at least one calibration sensor is coupled to said controller in a signal transmitting manner
a fill level determination unit whereby current actual fill level for said canisters can be determined based on an output of the dispensing means;
a fill level memory unit in which the fill level can be stored as the new, current actual fill level;
a comparator unit whereby a currently stored actual fill level can be compared with at least one predetermined fill level threshold output by the calibration sensor;
indicator signaling means whereby a detected necessary refilling process can be displayed; and
a fill level start value setting unit whereby a filling process can be detected and a start value can be set for the current actual fill level.

9. The metering device according to claim 8, wherein said controller further comprises calibration unit means whereby the calibration fill level can be set.

10. The metering device of claim 8 wherein said at least one calibration sensor is a capacitive sensor.

11. The metering device of claim 8 wherein said at least one calibration sensor is arranged on the outer wall of at least one said plurality of canisters.

12. The metering device of claim 11 wherein said at least one calibration sensor has opposing sensor surfaces and said surfaces are arranged on opposite sides of said outer wall.

13. The metering device of claim 8 wherein said calibration sensors are formed as film sensors integrally connected with an outer wall of at least one of said plurality of canisters.

14. The metering device of claim 8 wherein said dispensing means is a metering head.

* * * * *